(12) United States Patent
Rainer

(10) Patent No.: US 8,809,227 B1
(45) Date of Patent: Aug. 19, 2014

(54) METAL-ABSORBING POLYMER-CONTAINING PRODUCT

(76) Inventor: Norman B. Rainer, Richmond, VA (US)

( * ) Notice: Subject to any disclaimer, the term of this patent is extended or adjusted under 35 U.S.C. 154(b) by 729 days.

(21) Appl. No.: 12/661,618

(22) Filed: Mar. 22, 2010

Related U.S. Application Data

(60) Provisional application No. 61/269,152, filed on Jun. 22, 2009.

(51) Int. Cl.
*B01J 20/26* (2006.01)
*B01J 20/22* (2006.01)
*B01J 20/24* (2006.01)
*B01J 20/32* (2006.01)

(52) U.S. Cl.
USPC ............ 502/402; 502/400; 502/401; 502/404

(58) Field of Classification Search
USPC .................................. 502/400, 401, 402, 404
See application file for complete search history.

(56) References Cited

U.S. PATENT DOCUMENTS

| 5,646,076 | A * | 7/1997 | Bortz ............................. 442/136 |
| 6,638,319 | B2 * | 10/2003 | Sanduja et al. .............. 8/115.55 |
| 6,762,339 | B1 * | 7/2004 | Klun et al. ...................... 602/58 |
| 2002/0161122 | A1 * | 10/2002 | Rainer .......................... 525/178 |

OTHER PUBLICATIONS

O'Connell et al., "Heavy metal adsorbents prepared from the modification of cellulose: A review." Bioresource Tech., vol. 99 (2008), pp. 6709-6724 (available online Mar. 10, 2008).*

* cited by examiner

*Primary Examiner* — Stuart Hendrickson
*Assistant Examiner* — Daniel Berns
(74) *Attorney, Agent, or Firm* — Norman B. Rainer

(57) ABSTRACT

A composite product for the selective removal of dissolved heavy metal ions from water includes a high bulk cotton fabric incorporating a thermally generated polymer in sufficient amount to cause stiffening of the composite product and self-curling when immersed in water.

17 Claims, 2 Drawing Sheets

METAL-ABSORBING POLYMER-CONTAINING PRODUCT

RELATED APPLICATIONS

The present application claims the benefits of U.S. Provisional Application Ser. No. 61/269,152, filed Jun. 22, 2009, which is incorporated herein by this reference.

BACKGROUND OF THE INVENTION

1. Field of the Invention

This invention relates to the purification of water, and more particularly concerns compositions for the selective removal of trace levels of dissolved metals from water.

2. Description of the Prior Art

Undesirable pollutant species such as dissolved toxic metals can occur regularly or periodically in natural bodies of water such as lakes, rivers, streams, groundwater and stormwater, and in industrial waters such as landfill leachate, municipal sewage systems and wastewater discharges. The toxic metals are primarily multivalent "heavy" metals, and are usually present at "trace" concentrations below about 10 parts per million (ppm) amidst a vastly higher concentration of commonly abundant, innocuous species such as sodium, potassium, calcium, magnesium and aluminum.

A well known technique for removing such trace toxic metals in dissolved ionic form is to pass the polluted water through a stationary bed containing a particulate substance capable of selectively absorbing the toxic metals without absorbing the commonly abundant species. Synthetic polymers having the desired selective absorption property have been available in bead form made by catalyzed "addition" type suspension polymerization of a liquid styrene/divinylbenzene prepolymer mixture. The resultant spherical beads generally have a size in the range of 16 to 50 mesh (U.S. Sieve Series), or 1.2 mm to 0.3 mm, respectively. The beads are subsequently subjected to chemical treatment which imparts chelation or complexation functionality. The resultant product generally has a metal-absorbing capacity of about 1 milliequivalent/dry gram of absorbent. For example, if saturated with $Cu^{++}$, one dry gram of the absorbent would contain about 32 milligrams of copper, namely a 3.2% content of copper.

When employed as a stationary bed in a vertically oriented column through which water is caused to flow, said bead products produce a measurable impedance to the flow of water. The actual impedance, measured as psi/foot of bed depth, is dependent upon: a) flow rate, measured as gals/min./ $ft^2$ of bed cross section, b) average bead diameter, and c) temperature. In most applications, pumping at pressures up to about 30 psi, is required for effective operation of beds of spherical ion exchange beads. By way of comparison, beds of absorbents employed as "passive" or "in-situ" installations which depend upon hydrostatic pressure alone to propel the water, must be able to function with less than about 12 feet of hydrostatic pressure, or 5 psi.

When the water being remediated contains suspended matter such as soil particles, the suspended matter usually becomes filtered out within a bed of ion-exchange beads. Such action causes unacceptably high increase in the impedance to flow. Accordingly, the water to be treated must be pre-filtered to a total suspended solids (TSS) content below about 100 ppm. In fact, still other water pretreatments are commonly employed to protect the beads and thereby permit their re-use for economic considerations.

Other important factors concerning the use of water-treating absorbents are the speed and efficiency of operation. Bead form ion exchange absorbents generally have a kinetic performance such that a contact time of at least 2 minutes is required to produce at least 80% removal of the sought heavy metal ions. In applications such as the treatment of stormwater and other large flows, faster kinetics are required, generally at least 80+% removal within one minute of contact time.

Other synthetic polymers having selective metal-absorbing properties have been produced as granules of irregular size and shape, having been formed by "condensation" polymerization, namely the heating of an aqueous prepolymer solution. Examples of such non-bead form polymers for the selective absorption of dissolved metals are disclosed in U.S. Pat. Nos. 3,580,891 and 3,715,339, the disclosures of said patents being incorporated herein by reference. A classic example of a "condensation" type polymer is Nylon 6/6 produced by the DuPont Company of Wilmington, Del., wherein an aqueous prepolymer solution of hexamethylenediamine and adipic acid monomers is heated to drive off the water of solution and further heated to split out a molecule of water between interactive monomers.

Although certain granular polymers offer advantages over the bead form polymers produced by catalyzed suspension polymerization, the granular geometry has been found to produce unacceptably high impedance to the passage of water undergoing treatment. In attempts to overcome the problem of high impedance to flow, it has been sought to incorporate otherwise useful polymers onto or within large sized or porous carrier substrates. For example, the use of an open celled cellulose sponge of large monolithic shape as a carrier substrate is disclosed in U.S. Pat. No. 4,332,916. The use of small pieces of polymer-impregnated cellulosic sponge to form an absorption bed within a column for the selective removal of trace levels of heavy metals is disclosed in U.S. Pat. No. 5,064,540. Said patents are incorporated herein by reference. In fact, the small piece sponge product of U.S. Pat. No. 5,064,540 was the subject of a U.S. EPA Superfund Evaluation in 1994, reported as EPA/540/R-94/522, and incorporated herein by reference.

Other previously disclosed absorbents which either possess natural affinity for heavy metal ions or function as carrier substrates for appropriate polymers include peanut shells, soybean hulls, corn husks, tobacco stems, leaf compost, and minerals. Several shortcomings have been encountered with such previously disclosed absorbents, including: saturation capacities below 2%; slow kinetics; compaction during use; and disposal issues.

It is accordingly an object of the present invention to provide a water-treating product having selective affinity for dissolved heavy metal ions and presenting low impedance to the flow of water.

It is a further object of this invention to provide a water-treating product as in the foregoing object having a high saturation capacity and fast kinetics of operation.

It is another object of the present invention to provide a product of the aforesaid nature which includes a polymer derived from the thermal treatment of monomer components of an aqueous prepolymer solution.

It is an additional object of this invention to provide a water-treating product of the aforesaid nature which is relatively insensitive to suspended matter, and can be disposed in an environmentally acceptable manner.

It is a still further object of the present invention to provide a product of the aforesaid nature which is of sufficiently low cost to justify disposal following one time use.

These objects and other objects and advantages of the invention will be apparent from the following description.

SUMMARY OF THE INVENTION

The above and other beneficial objects and advantages are accomplished in accordance with the present invention by a composite product comprised of a high bulk cotton fabric incorporating a polymer having selective affinity for dissolved heavy metal ions, the amount and nature of said polymer being such as to cause said composite product to be substantially self-supporting and shape-retaining when immersed in water.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
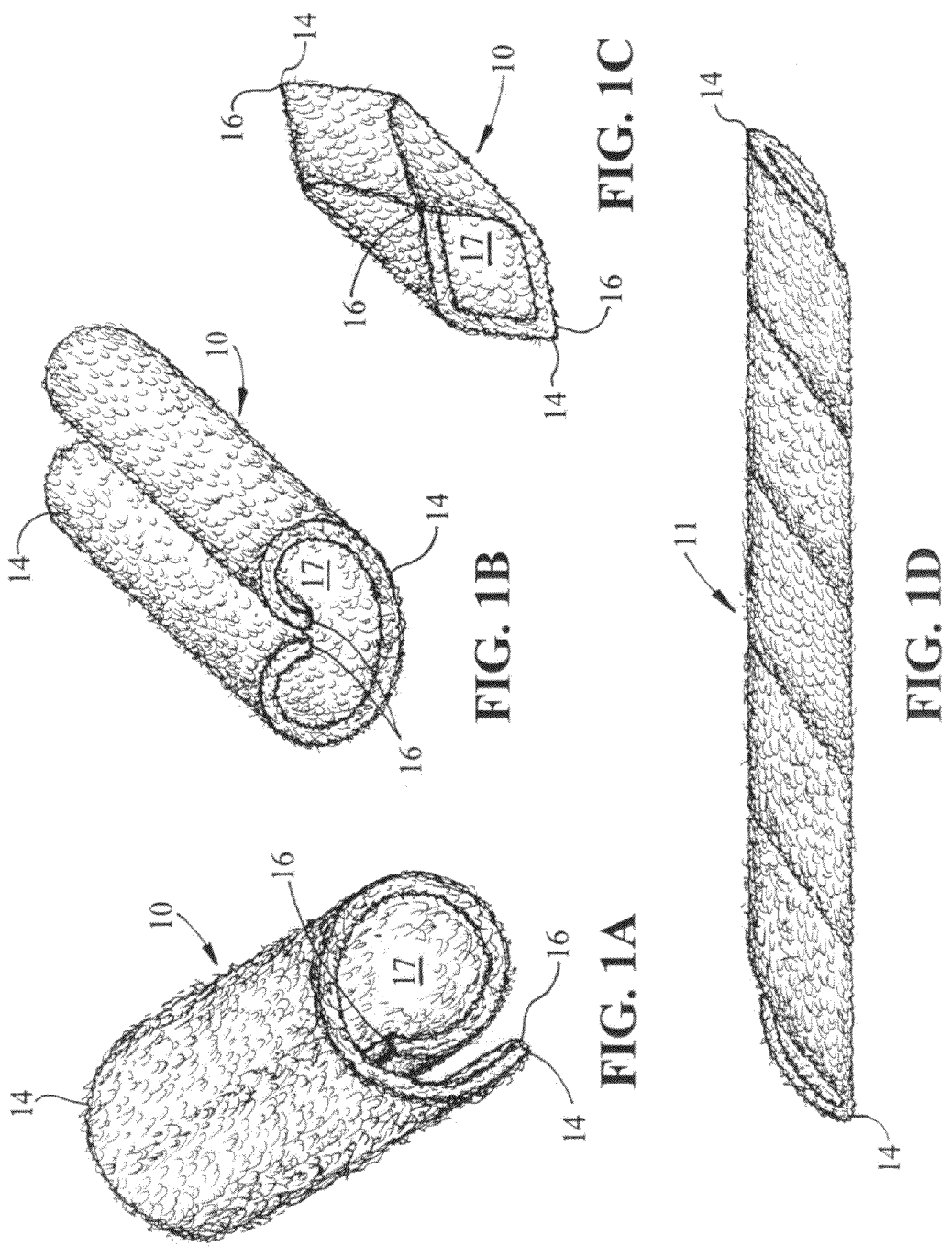
FIGS. 1a, 1b, 1c, and 1d are perspective views of differently shaped pieces of the water treatment product of the present invention.

The product of this invention is based upon the use of a high bulk cotton fabric having high water absorbency. The fabric should have a cotton content of at least 80%, and is preferably 100% cotton. The fabric is preferably of undyed white woven construction such as terry cloth or waffle fabric, which are generally employed as toweling or bathrobe garments. The bulk or basis weight of the fabric should be greater than 8 oz./sq.yd., and is preferably between about 10 and 20 oz./sq.yd.

In producing the product of this invention, the aforesaid cotton fabrics are treated with an aqueous prepolymer solution containing monomeric constituents capable of undergoing condensation polymerization when the water of solution is removed and the residual monomeric constituents are heated to a polymerization temperature. The resultant polymer forms within the cotton fibers and as a coating upon the fibers, and further occupies the interstices of the fabric. Such several modes of in situ polymer deposition produce a significant stiffening effect which is essential for the sought functionality of the composite product of this invention. The stiffness of the product, in dry form, is greater than 3 inches as determined by ASTM procedure D1388 which measures the horizontally extended length required to produce a droop angle of 42 degrees. In preferred embodiments, the product of this invention has a stiffness value between 2 and 7 times greater than the starting fabric, which generally has a stiffness value of about 1.5 inches. The expression "dry", as employed herein denotes a fabric or composite product having a moisture content of about 7% by way of equilibration to ambient air at 70 deg. F. and 50% R.H. (relative humidity).

It has been found that, to achieve effective stiffening, at least a 25% by weight add-on of the polymer is needed. Although increased amounts of polymer content are beneficial, polymer contents above 70% cause an undesirable loss of porosity of the composite product. At said levels of polymer content, the product can hold, at saturation, between 3% and 10% by weight of absorbed metal species. Preferred embodiments will hold at least 3.5% of absorbed metal species.

In the process for manufacturing the composite product of this invention, the fabric starting material is preferably treated to saturation with said prepolymer solution at a temperature in the range of 100° F. to 212° F. Non-absorbed solution is removed by squeezing or centrifugal effect, and the wet fabric is subjected to heat treatment to evaporate off the water of solution. The fabric, preferably in a flattened state, is heated further at temperatures in the range of 295° F. to 340° F. to "cure" the polymer, namely to cause interaction between the monomeric components of the prepolymer solution. The duration of the overall heating operation may range from about 15 minutes to an hour, depending upon the size and geometry of the batch, the nature of the heating equipment, agitation and venting conditions, and the temperature employed. The resultant product is a substantially flat sheet of leather-like consistency.

Although the composite product may be used in flat or pleated sheet form for water treatment as a supported permeable substrate, the primary utilization of the product is in the form of relatively small, three-dimensionally contoured pieces that can produce an absorption bed within a conduit.

Figure 2:
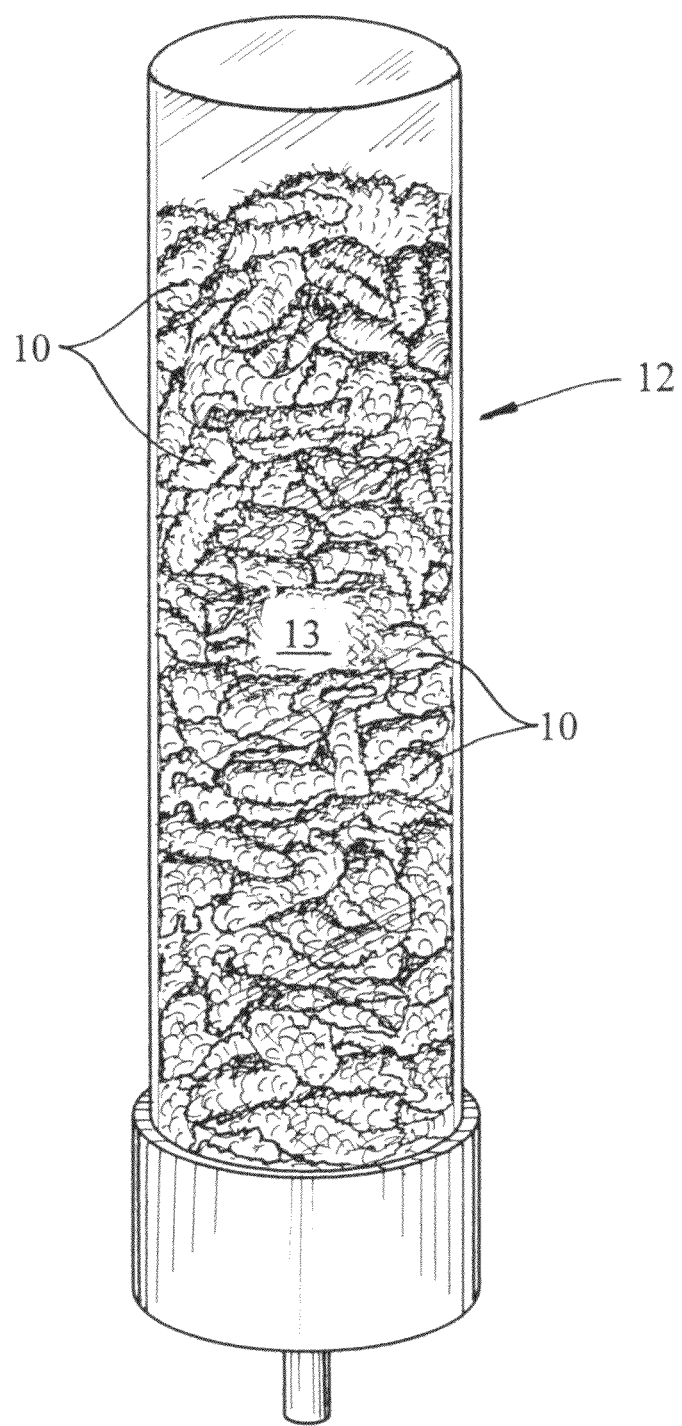
FIG. 2 is a front view of a transparent column containing a bed comprised of a multitude of pieces of FIGS. 1a-1c.

It has been further discovered that suitably contoured curled pieces can be produced merely by immersing narrow strips of the cured composite product into water. The strips are preferably produced by cutting from a flat sheet of the composite product strips having a width of 1"-3" and length up to about 10 inches. Pieces of square contour are preferred. Upon immersion, the flat strips or pieces automatically undergo distortion to produce curled three dimensioned pieces which are shape-retentive and retain or surpass the stiffness of the precursor dry sheet. FIGS. 1a-1c illustrate the shapes of curled pieces 10 resulting from flat rectangular pieces of 1"-2" size, said curled pieces having four apices 16 and a tubular internal passage 17. FIG. 1d illustrates a spirally shaped curled piece 11 resulting from a flat strip measuring 1½"×8". FIG. 2 illustrates a vertical column 12 containing a bed 13 comprised of a randomly oriented multitude of curled pieces 10 shaped as in FIGS. 1a-1c. The lengths of said curled pieces may be defined herein as the distance between two apices of maximum separation 14. For optimal results, the lengths of the curled pieces should be between 1 and 10 inches.

The curled contour enhances the rigidity of the pieces. Consequently, an aggregation of a multitude of the curled pieces in random orientation has a low bulk density. For example, a cubic foot of said curled pieces in wet state, when confined as a gravity-settled multitude, weighs between 8 and 30 pounds. By way of comparison, a cubic foot of the aforementioned prior art bead form ion exchange resin weighs about 50 pounds. Such low bulk density is an economic advantage and also results in very low impedance to the flow of water. Specifically, the flow impedance of a bed of the aforementioned curled pieces is generally less than 1 psi/ft. of bed height at a flow rate of 20 gpm/sq. ft. of bed cross section. A further advantage of the curled configuration is that water which flows through a bed of the shaped pieces in a vertical column flows in part transversely across the bed because of the directing effect of random laterally oriented tubular passages. This causes the water which is undergoing remediation to travel a longer pathway and thereby undergo longer contact with the metal-removing curled pieces. For ease of use, the curled pieces may be confined within an enlongated fishnet bag which is preferably employed in water-conveying cylindrical vessels having a diameter of at least 6 inches. The low bulk density further makes it easier to lift a bed of the pieces, confined within a fishnet bag, upwardly from the confining vessel.

The polymer component of the product of this invention must have selective absorption affinity for dissolved "heavy metals", which are multivalent ions of metals in groups IV through VIII of the Periodic Table. Said metals are also referred to as "Transition elements", and most are, even in trace amounts, toxic to humans. Polymers having the requisite selectivity generally possess functional groups which can react with metal ions either by way of a complexation or chelation mechanism, and preferably remove dissolved metal species in both cationic and anionic states.

Complexation functionality generally involves ligand sites on the polymer capable of producing a coordination complex with a metal species. Typical ligand sites include aliphatic amines, especially when spaced apart by an ethylene group. Such spaced apart amine groups function as a bidentate ligand which strongly interacts with many transition elements. Monomers which incorporate such ligand sites into the polymer include diethylenetriamine, triethylene tetramine and polyethyleneimine. Chelation groups can generally be incorporated into a polymer by way of monomers containing multiple carboxylic acid groups. Suitable species include iminodiacetic acid and nitrilotriacetic acid. Chelation functionality may also be imparted to the polymer by way of post-treatments with carbon disulfide or other reactants. When monomers containing multiple amine groups are mixed with monomers containing multiple carboxylic groups, and the mixture is heated, a condensation type polymer is produced by the splitting out of a molecule of water between paired monomers, thereby producing a polyamide polymer. The polymer employed in the present invention is preferably cross-linked, and accordingly non-melting and insoluble in water. The polymer preferably is also aliphatic, namely devoid of benzenoid ring species which could generate carcinogenic condensed ring species upon disposal by way of incineration.

The relatively high surface area of the cotton fabric causes the resultant metal-absorbing pieces to exhibit very high kinetics for the absorption of dissolved metal species. In particular, a bed of the metal absorbing curled pieces of this invention can remove from water greater than 80% of certain toxic metal species within a contact time of less than one minute, and usually less than 30 seconds. Such rapid effectiveness coupled with low impedance to flow and insensitivity to suspended solids causes this product to be eminently suited for the treatment of large flows of water such as stormwater.

The flow impedance of the shaped polymer-containing pieces, when measured in a column packed with a bed comprised of a multitude of the pieces, and with water at 80° F. passing downwardly through the bed, is generally less than 0.4 psi (pound per square inch) per foot of bed height at a flow rate of 20 gpm (gallons per minute) per square foot of entrance surface of the bed. By way of comparison, a similar bed consisting of bead-form ion exchange resin of 16 to 45 mesh size (U.S. Sieve Series) produces a flow impedance of 1.8 psi per foot of bed height when comparably tested.

A further understanding of my invention will be had from a consideration of the following examples which illustrate certain preferred embodiments. It is to be understood that the instant invention is not to be construed as being limited by said examples or by the details therein.

EXAMPLE 1

Two 20"×25" pieces of white 100% cotton woven terrycloth fabric having a basis weight of 14 ounces/sq.yd. with characteristic surface loops were selected having a total dry weight of 296 grams and an ASTM stiffness of 1.5 inches. The pieces were immersed in a prepolymer solution containing polyethyleneimine (PEI) (molecular weight 1200) and nitrilotriacetic acid (NTA) in a NTA/PEI weight ratio of 0.75, and constituting 46% of the weight of the solution. The fabric pieces were then run through wringer rollers to remove excess solution, and were hung in an oven at 330° F. for 50 minutes. The resultant pieces were of leather-like consistency having a polymer content of 49% and an ASTM stiffness of 7.3 inches.

The sheets were slit into 1½" wide strips, which were then cut to produce flat 1½" square pieces. The square pieces were immersed in warm tap water, whereupon they underwent automatic distortion to produce curled pieces as shown in FIG. 1c. The wet pieces were loaded into a vertical plexiglas column of 6" diameter to produce a randomized bed having a flow impedance of 0.1 psi/ft at a flow rate of 20 gpm/ft$^2$.

The bed was tested for compressive strength by employing a weighted plunger with a tamping effect to achieve maximum compaction of the bed. The test was repeated using the same curled pieces in dry form (having been equilibrated to ambient air @ 70° F. and 50% R.H.). It was found that the wet pieces were 20% more resistant to compaction than the dry pieces, thereby confirming that the curled pieces are stronger in a wet state than in a dry state. The significance of the high resistance to compaction is that the curled pieces will not undergo autocompaction in the course of prolonged use.

The bed of curled pieces was employed to treat a water solution containing 100 ppb each of heavy metals: $Hg^{++}$, $Cd^{++}$, $Pb^{++}$ and $Cu^{++}$, and 200 ppm $Na^{++}$. The flow rate was adjusted to provide a 60 second contact time based upon an "empty bed" calculation wherein: volume of the bed (gals)÷flow through the bed (gpm)=residence time in the bed (mins.). Such flow was found to produce 95+% removal of the heavy metal species. The saturation capacity of the curled pieces for the dissolved metals was determined to be 6.3% by treating a single curled piece with a solution having saturation concentrations of said heavy metals.

By way of comparison, the same prepolymer solution and polymerization process was applied to high bulk fabrics of nylon and polyester. In both instances, upon immersion in water, the polymer separated away from the fabric as fragmented particles, leaving the fabric in substantially its original state.

EXAMPLE 2

A length of 100% cotton terry cloth fabric of 14 oz./sq.yd. basis weight was cut into a multitude of 1½" square pieces. A weight of 0.80 pounds of the pieces was soaked in an aqueous prepolymer solution comprised of 78% water, 12.6% polyethyleneimine (molecular weight 1800) and 9.4% nitrilotriacetic acid. The soaked pieces were then removed and squeezed to remove excess, non-absorbed liquid. The weight of solution absorbed was 2.1 pounds.

The squeezed pieces were entered into a rotating drum oven operating at 300° F. After a period of 4 hours, the pieces were removed from the oven and re-weighed. The treated pieces have randomly curled, spiraled and folded shapes, and have a polymer content of 36%. A multitude of the polymer-containing pieces was entered into a vertically standing transparent plastic column of 6" inside diameter to form a bed which was washed with water, then drained. The column was vibrated to achieve maximum gravimetric settling of the bed of wet pieces. The bulk density thereby measured is 9.7 pounds per cubic foot. Water was then run downwardly through the column, driven by a 2.0 foot hydrostatic head within the column. The immersed pieces in the bed retain their shape. The measured impedance to flow through the bed is 0.1 psi per foot of bed height at a flow rate of 20 gallons per minute per square foot of entrance surface of the bed.

Water containing 5 parts per million of copper at a pH of 4.2 was then run downwardly through the bed at a rate to provide a contact time within the bed of 30 seconds. The effluent water contained no detectable copper. In a separate experiment, some of the polymer-containing pieces were soaked in a concentrated copper sulfate solution. The resultant copper-saturated pieces were analyzed by way of chemical digestion followed by ICP (Inductively Coupled Plasma) examination and found to have a copper content of 4.7% (dry weight basis).

EXAMPLE 3

In a series of experiments, several properties of the composite product of this invention were measured in response to varied polymer content. The results are presented in Table 1. The methods of production and testing were substantially the same as described herein above, and based upon a terrycloth fabric of 14 oz/yd$^2$. The curled pieces were confined as a random bed of 3 foot height in a cylinder of 8" inside diameter, and caused to treat a continuous gravity flow of water providing a 2 foot hydrostatic head above the bed.

TABLE 1

| Polymer Content (%) | Stiffness (dry)[1] | Saturation Capacity[2] | Kinetics[3] | Flow Impedance[4] |
|---|---|---|---|---|
| 25 | 3.2 | 2.4 | 96 | 0.2 |
| 29 | 4.7 | 3.3 | >99 | 0.3 |
| 37 | 5.4 | 4.7 | >99 | 0.2 |
| 46 | 6.8 | 6.2 | 97 | 0.1 |
| 54 | 7.3 | 7.1 | 95 | 0.1 |
| 65 | 8.2 | 7.4 | 92 | 0.1 | footnotes:
1 = inches to produce a 42° droop angle via ASTM method D1388-
2 = weight percent of absorbable metal species
3 = % removal at 40 seconds contact time
4 = psi/foot of bed height at a flow of 20 gpm/ft$^2$ of entry surface, and based upon a bed of curled pieces derived from 2" squares The metal-saturated composite product will generally pass the EPA TCLP test, which means that the absorbed metals will not leach out. Disposal may be by way of biodegradation as in a land fill, or by incineration, with careful attention given to the resultant flue gases, particularly where volatile metals such as mercury are present. However, because the absorption product is devoid of benzenoid species, condensed ring carcinogenic compounds are not produced via incineration.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A product comprising a high bulk cotton fabric having a basis weight between 8 and 20 ounces per square yard and incorporating 25% to 70% by weight of a polymer having selective absorptive affinity for dissolved species, and when immersed in water, spontaneously distorts to a curled, shape-retaining configuration capable of absorbing an amount of said dissolved species greater than 2% of the dry weight of said product.

2. The product of claim 1 wherein said fabric is a woven terrycloth having surface loops.

3. The product of claim 1 wherein said polymer is a thermally produced condensation polymer derived from an aqueous prepolymer solution deposited within the interstices of said fabric.

4. The product of claim 3 wherein said polymer has selective affinity for trace concentrations of dissolved heavy metal species in cationic and anionic states in waters containing commonly abundant innocuous metal species selected from the group consisting of sodium, potassium and calcium.

5. The product of claim 3 wherein said prepolymer solution contains a polyfunctional aliphatic amine and a polyfunctional aliphatic carboxylic acid.

6. The product of claim 5 wherein said amine is polyethyleneimine.

7. The product of claim 6 wherein said carboxylic acid is nitrilotriacetic acid.

8. A product comprising a high bulk cotton fabric containing a sufficient amount of a metal ion absorbing polymer to cause said product, when immersed in water, to spontaneously distort to a curled, shape-retaining configuration, said product being in the form of pieces measuring between 1-10 inches in length, and wherein a randomly oriented multitude of said pieces in a water-saturated state and uncompacted except for gravity force has a bulk density less than 30 pounds per cubic foot.

9. The product of claim 8 wherein said pieces, in a water-saturated state, have greater resistance to compaction than the same pieces in a substantially dry state.

10. A multitude of the pieces of claim 8 confined in random orientation as a stationary bed which permits passage of water for the removal of trace heavy metals therefrom.

11. The bed of claim 10 having the ability to remove 60+% of metal ions from said water within a contact time of less than one minute.

12. The bed of claim 10 having an impedance to flow therethrough of less than 1 psi per foot of bed height at a flow rate of 20 gpm/sq.ft. of entrance surface of the bed.

13. The pieces of claim 8 having four apices.

14. A product comprising a high bulk cotton fabric containing a sufficient amount of a metal ion-absorbing polymer to cause said product, when immersed in water, to spontaneously distort to a curled, shape-retaining configuration, said product having a stiffness, in a substantially dry state, greater than 3 inches, as measured by ASTM method D1388.

15. A process for producing a structured product for selectively absorbing trace levels of dissolved toxic ionic species from water when employed as a stationary bed within a conduit through which water flows by gravity effect, said process involving the preparation of an aqueous prepolymer solution of polyethyleneimine and nitrilotriacetic acid, impregnating a cotton terrycloth fabric of 8 to 20 ounce/sq.yd. basis weight with said solution, and heating the impregnated fabric at a temperature above about 300° F. to cause formation of a polyamide in situ within said fabric.

16. A product for removing dissolved species from water comprising a high bulk cotton fabric having a basis weight between 8 and 20 ounces per square yard and incorporating 25% to 70% by weight of a condensation polymer having been generated within said fabric, said product, when immersed in water spontaneously distorting to a substantially rigid configuration having an internal passage, and capable of absorbing an amount of said dissolved species greater than 2% of the dry weight of said product.

17. A product comprising a multitude of pieces of cotton fabric having a basis weight between 8 and 20 ounces per square yard incorporating 25% to 70% of a polymer having selective absorptive affinity for species dissolved in water, and when immersed in water spontaneously distort to substantially rigid configurations having an internal passage and capable of absorbing an amount of said dissolved species greater than 2% of the dry weight of said product.

* * * * *